United States Patent [19]
Eaton et al.

[11] Patent Number: 6,044,260
[45] Date of Patent: Mar. 28, 2000

[54] METHOD OF CONTROLLING THE NUMBER OF MESSAGES RECEIVED BY A PERSONAL MESSAGING UNIT

[75] Inventors: Eric Thomas Eaton, Lake Worth; Michael Joseph DeLuca, Boca Raton, both of Fla.

[73] Assignee: Motorola, Inc., Schaumburg, Ill.

[21] Appl. No.: 08/926,581

[22] Filed: Sep. 2, 1997

[51] Int. Cl.[7] .................................................. H04M 15/00
[52] U.S. Cl. ..................... 455/406; 455/407; 340/825.33; 379/112
[58] Field of Search .......................... 340/825.44, 825.33, 340/825.35, 825.32; 370/238; 379/112, 113, 114, 115; 455/38.1, 405, 406, 445, 458, 517, 412, 413, 414, 407, 408, 409, 417

[56] References Cited

U.S. PATENT DOCUMENTS 5,376,931  12/1994  Marrs .
5,703,570  12/1997  Gorday et al. ..................... 340/825.44
5,748,620   5/1998  Capurka ................................. 455/433

Primary Examiner—Reinhard J. Eisenzopf
Assistant Examiner—Greta J. Fuller
Attorney, Agent, or Firm—James A. Lamb

[57] ABSTRACT

A subscriber's PMU (Personal Messaging Unit) (14) determines when the number of incoming messages is likely to be excessive by counting the incoming messages and comparing their number and rate of receipt to stored thresholds. The subscriber is alerted when an excess is detected, and he is given options such as: routing future messages to himself via alternate and less expensive communication links (34,38), or terminating messages sent to one of his PMU's addresses that has been receiving messages at a high rate. Similar control can be effected at the PMU's base station (12).

14 Claims, 4 Drawing Sheets

METHOD OF CONTROLLING THE NUMBER OF MESSAGES RECEIVED BY A PERSONAL MESSAGING UNIT

FIELD OF THE INVENTION

This invention is directed generally to personal messaging units, and more particularly to techniques for controlling the number and cost of messages sent to a personal messaging unit.

BACKGROUND OF THE INVENTION

A personal messaging unit (sometimes referred to herein as a "PMU") such as a pager subscribes to a messaging service for the purpose of receiving messages that can originate from a number of sources. Most personal messages originate from telephones, but other messages can originate from computers, news, stock reporting services and from various other sources.

Typically, the user of a PMU pays a flat monthly fee to the messaging service. For that fee, the user (referred to hereinafter as a "subscriber") is permitted to receive a certain number of messages per billing period, with an extra charge for each message which exceeds that number. Thus, a subscriber who receives more messages than he anticipated may receive a correspondingly larger bill.

This problem has become aggravated by the introduction of new messaging services, such as E-mail notification. In this type of service, whenever an E-mail message is sent to a subscriber's computer, the subscriber is notified of that event by a brief message that is transmitted to his PMU. A subscriber who receives a large number of unsolicited E-mail messages may find that his monthly bill greatly exceeds his expectations.

It has been proposed to limit a subscriber's cost by programming his PMU to count the number of incoming messages and to stop displaying received messages when a certain number have been received. For some subscribers, this solution is adequate. Other subscribers need more flexibility to ensure that they can control their costs without missing messages that are important to them.

DESCRIPTION OF THE PREFERRED EMBODIMENTS

Figure 1:
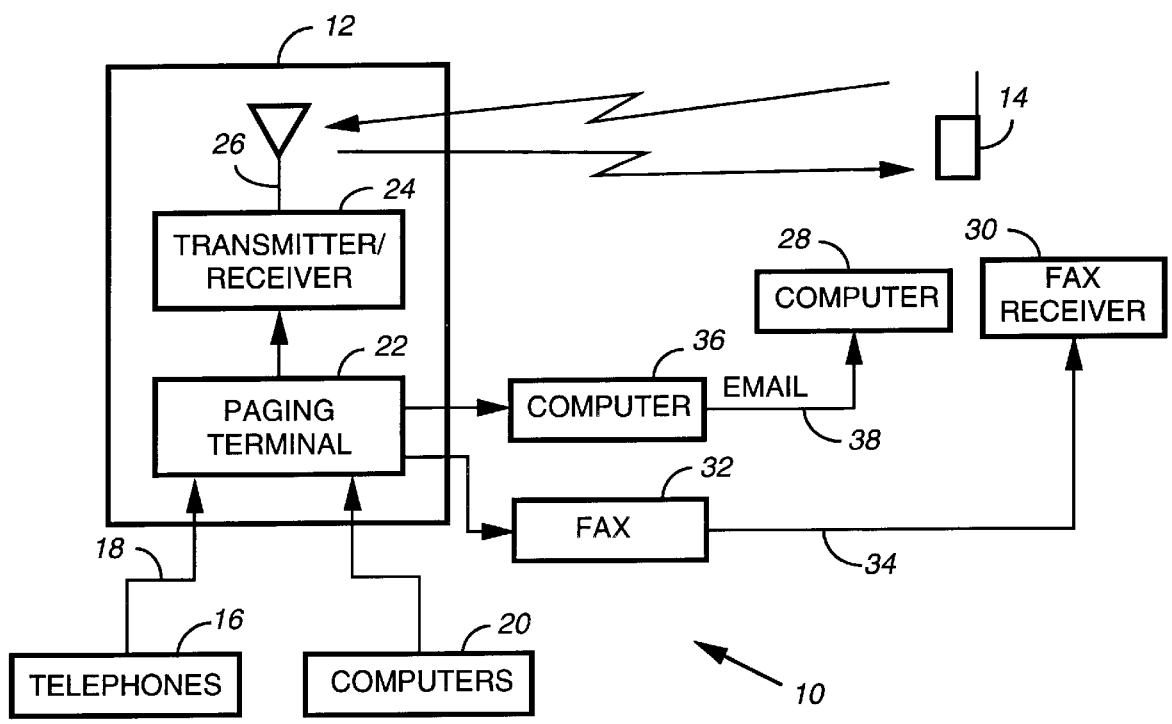
FIG. 1 illustrates a wireless messaging system that operates in accordance with the invention.

Referring to FIG. 1, the illustrated wireless messaging system 10 includes a base station 12 that receives messages that are to be transmitted to a PMU 14. These messages typically originate from telephones 16 that communicate message requests through a public switched telephone network (not shown) and a communication link 18 to the base station 12. Other message requests can originate from various other sources, such as from computers 20 that can generate a large number of message requests in a relatively short period of time.

In the illustrated exemplary embodiment, the base station is a paging base station that includes a paging terminal 22, a transmitter/receiver 24 and an antenna 26. The paging terminal 22 formats and encodes messages to be transmitted, including adding a selective call address that ensures that only the intended PMU receives and decodes a message that is intended solely for it.

The PMU 14 may be a conventional two-way pager that has been modified (as discussed below) to operate according to the invention. The PMU 14 preferably has multiple addresses for receiving messages from multiple sources. For example, one address may be for receiving personal messages that originate from telephones. Another address may be for receiving stock quotes generated by one of the computers 20. Yet another address can be dedicated to receiving E-mail notifications or sports messages. The base station 12 transmits all such messages, properly addressed, to PMU's located throughout its coverage area.

As discussed previously, a subscriber (a user of a PMU that is subscribed to the messaging service) typically pays a flat monthly fee to receive a limited number of messages from the messaging service. Messages that exceed that limit result in extra charges. In the illustrated example, we assume that the PMU 14 has three addresses, one for personal messages, one for stock quotes and one for E-mail notification. If the PMU's subscriber receives a high volume of E-mail, computers 20 will send a correspondingly high volume of E-mail notification requests to the base station 12, and the PMU will receive the same high volume of notification messages. For a given billing period, the total number of messages may far exceed the limited number permitted without extra charges, with the E-mail notification messages constituting 90% or more of the total number of messages.

In FIG. 1, the subscriber who uses the PMU 14 is assumed to also have access to alternate devices for receiving messages, such as a computer 28 and a facsimile (fax) receiver 30. According to one aspect of the invention, these and other alternate communication devices are used to supplement the communication capabilities of the PMU. This can be done at the base station end of the communication system, or, preferably, at the PMU 14. In the latter case, the PMU 14 stores a threshold number that indicates a number of messages that the PMU 14 is to receive within a given period of time, such as within a one month billing period. The threshold number is preferably the total number of messages that the PMU 14 is permitted to receive within the billing period without additional cost. As incoming messages are received, the PMU 14 counts them and determines whether the number of incoming messages is likely to exceed the threshold number. If the threshold number is likely to be exceeded, the messaging service is instructed to send messages to the subscriber via an alternate route (e.g., using computer 28 or to fax receiver 30). Such instructions to the messaging service preferably occurs by the PMU 14 transmitting the instruction to the base station 12.

There are two ways contemplated for determining whether the number of incoming messages is likely to exceed the threshold number. The most direct way is to compare the number of incoming calls to the threshold number; when the number of incoming calls equals or exceeds the threshold number, the messaging service is instructed to send further messages to the subscriber via an alternate route. The second way is to determine the rate at which messages are being received, and from that information to decide whether future messages should be communicated to the subscriber via an alternate route. This is discussed in more detail later.

To employ alternate routes, the messaging system includes a fax transmitter 32 for sending messages to the subscriber's fax receiver 30 via communication link 34, and a computer 36 for sending E-mail messages to the subscriber's computer 28 via communication link 38. Modems (not shown) will be included where necessary. With this arrangement, and after the threshold number of messages has been sent, the paging terminal 22 directs messages originating from telephones 16 and computers 20 to the fax transmitter 32 or to the computer 36. Preferably, the paging terminal stores those messages until they can be sent over links 34 and 38 at a time when it is economical to do so. In this manner, the PMU's subscriber does not incur unexpectedly high bills due to a large number of excess messages transmitted to PMU 14, but no messages are lost because they can be received via the alternate routes. Various options and modifications are discussed later in connection with the flow charts shown in FIGS. 3 and 4.

Figure 2:
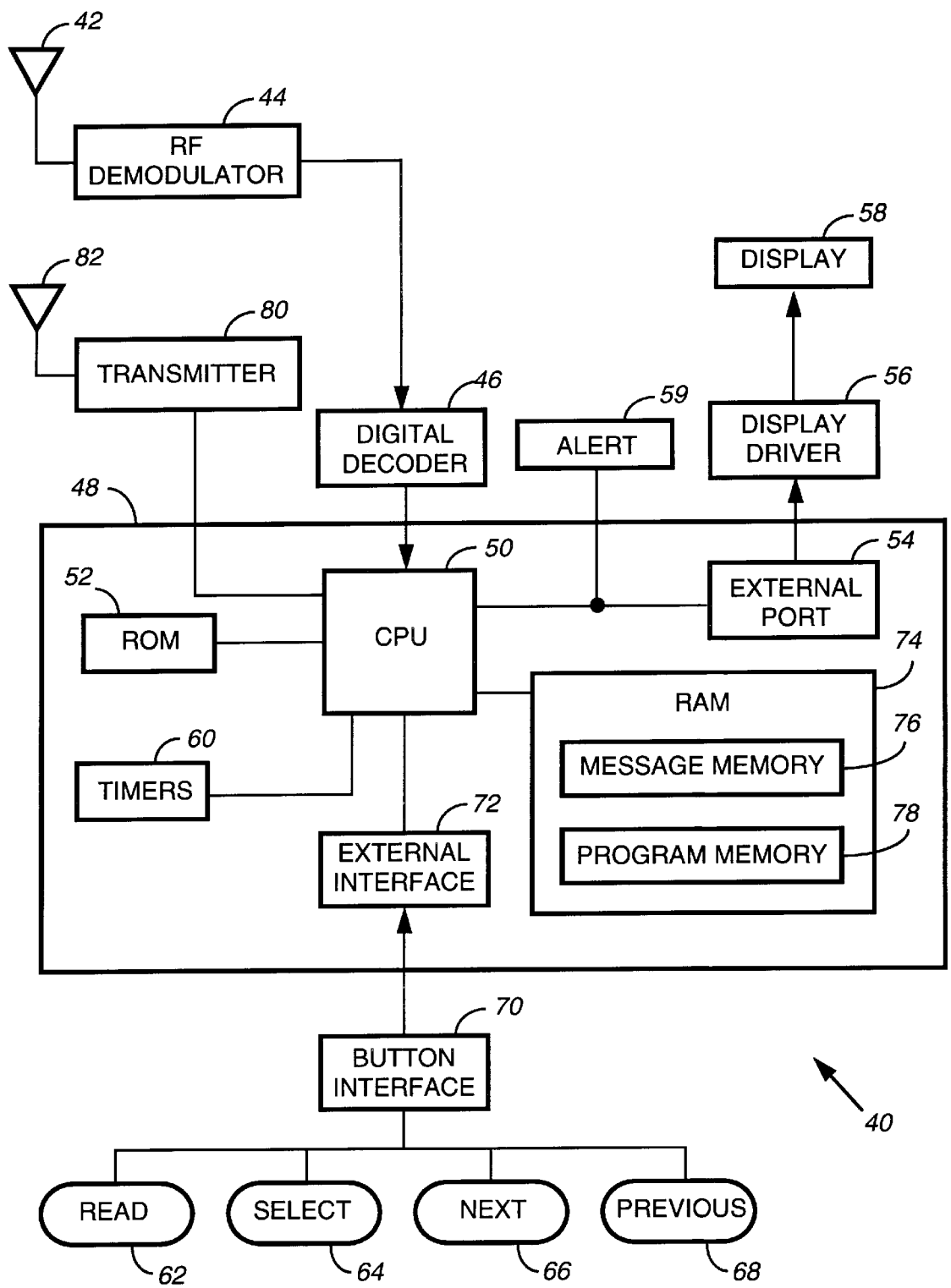
FIG. 2 is a block diagram of a PMU that is programmed to operate with the wireless messaging system according to the invention.

Turning now to FIG. 2, a PMU 40 is shown that operates in accordance with the invention. The illustrated PMU 40, shown in the form of a selective call transceiver, is constructed of conventional components but is specially programmed to operate in the messaging system shown in FIG. 1. The PMU's circuitry includes a receiving antenna 42, an RF demodulator 44 and a digital decoder 46 for receiving and decoding incoming messages. Messages received by the antenna 42 are demodulated by the demodulator 44 to provide demodulated analog data as an input to the decoder 46.

The signal output from the decoder 46 is applied as an input to a processor 48 which may be, for example, a MC68HC05 made by Motorola, Inc. The processor 48 includes a CPU 50 and a ROM 52 which stores the instruction program that enables the CPU to carry out its conventional functions and to cause the PMU 40 to operate in accordance with the invention.

The processor also includes an external port interface 54 for coupling signals from the CPU 50 to a display driver 56. The latter device drives a display 58, which may be a conventional liquid crystal display, for displaying decoded messages and other information. An alert device 59 generates an audible or vibratory alert to alert the subscriber to various events or situations, including indicating to the subscriber that a message has been received.

Timers 60 are coupled to the CPU 50 to give a time base for collecting data from the decoder 46 at precise intervals.

The subscriber may control various functions of the PMU by means of user-actuatable buttons entitled Read (62), Select (64), Next (66) and Previous (68) that are coupled to the CPU via a button interface 70 and an external port interface 72. The buttons may be used to cause a received message to be shown on the display 58, to scroll through messages, to exit reading messages, and various other conventional functions. The processor 48 also includes a RAM (Random Access Memory) 74 that comprises a message memory 76 and a program memory 78. The program memory 78 acts as a scratch pad memory for temporary storage of new messages (before being stored in message memory 76) or the results of computations made by the CPU 50.

To send information back to the base station 12, the PMU includes a transmitter 80, driven by an output from the CPU 50, and a transmitting antenna 82.

Figure 3:
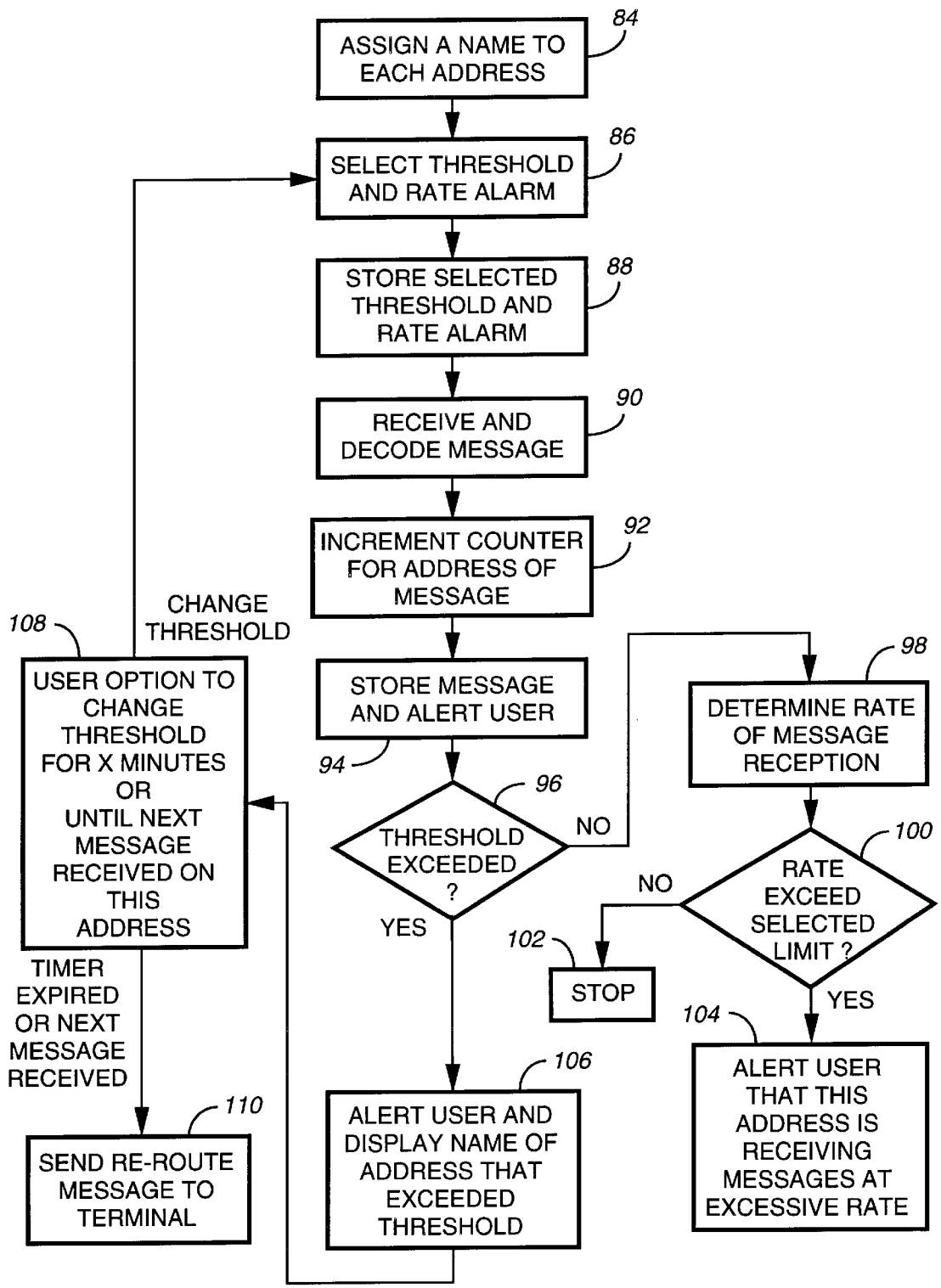
FIG. 3 is a flow chart illustrating how the PMU is programmed to operate according to the invention.

The CPU 50 is programmed to allow the PMU 40 to operate in accordance with the invention in the manner shown in FIG. 3, to which reference is now made.

In the first step 84 (which is optional), the subscriber assigns a name to each address used by its PMU. For example, if the subscriber's PMU has three addresses per the example discussed above, one address might be assigned the name "Personal", the second address might be assigned the name "Stocks" and the third address might be assigned the name "E-mail". Each of these names is used by the PMU to alert the subscriber, as discussed in more detail below, when one of these addresses is receiving an excessive number of messages. The assignment of a name to each of the addresses is preferably effected upon initial power-up, by the PMU, prompting the subscriber, via instructions presented on the display 58, to use the buttons 62–68 to input a name for each address.

In the next step 86, the PMU prompts the subscriber to select a threshold number and a rate alarm. The threshold number is preferably equal to the total number of messages that the subscriber is permitted to receive in any one billing period without an extra charge. For example, if a subscriber is permitted to receive 100 messages per month without paying an extra charge, then the threshold number is preferably selected to be 100, and that number is input to the PMU by the subscriber using the buttons 62–68. The rate which the subscriber is asked to select is a rate of receiving messages on any one address which the subscriber would consider to be an excessive rate, a rate which is likely to cause the total number of incoming messages to exceed the threshold number during the billing period. For example, if the subscriber is permitted to receive 100 messages per month without paying an additional charge, the receipt of 30 messages per hour could be selected to be the rate at which the total number of received messages is likely to exceed the threshold number, thus resulting in a higher cost than the subscriber is willing to pay. Accordingly, in the next step 88, the subscriber uses the buttons 62–68 to input "30%" as the rate to be monitored by the PMU.

In step 90, the PMU 14 receives and decodes an incoming message and then, in step 92, increments an internal counter associated with the address to which the incoming message was sent. Thus, if the last incoming message was a personal message, then a "Personal" message counter would be incremented by one. The PMU then stores the incoming message and alerts the subscriber to the fact that a message has been received (step 94).

In step 96, a determination is made as to whether the threshold has been exceeded. In other words, the PMU determines whether the accumulated count of all the internal counters exceeds the threshold number selected by the subscriber in step 86. If that threshold has not been exceeded by the last received message, the PMU 14 then determines whether the address used by the last message is receiving messages at an excessive rate, a rate which is likely to cause the threshold number to be exceeded. To effect this determination, the program proceeds from step 96 to step 98 where the PMU determines the rate of message reception. Using a conventional internal clock and the number stored in the counter which was incremented in step 92, the PMU determines (step 100) whether the rate of receiving messages at the last used address exceeds the rate selected by the subscriber in step 86. If the selected rate is not being exceeded, this part of the program ends at step 102. If the present rate of receiving messages at the last used address does exceed the selected rate limit, the program proceeds to step 104 where the subscriber is alerted to the fact that the last used address is receiving messages at an excessive rate. This alert is preferably achieved by activating the alert device 59 (FIG. 2) and by presenting on the display 58 a message that shows the name of the address (e.g., E-Mail) that is receiving messages at an excessive rate.

At this point, the subscriber has various options. The subscriber may take no action and allow the rate of message receipt to continue. In that case, it is likely that the subscriber's PMU will receive an excessive number of messages during the billing period, and so the subscriber will expect to receive a bill having additional charges. Another option that the subscriber has is to contact the messaging service to discontinue sending messages to the named address for the remainder of the billing period. In any case, the subscriber who has been alerted to the fact that he or she is receiving messages on a certain address at an excessive rate is given the option of taking a course of action which appears to be most beneficial to the subscriber.

Referring back to step 96, if the threshold number was exceeded when that step was executed, the program continues to step 106 where the subscriber is alerted to the fact that the threshold number was exceeded, and the PMU causes the display 58 to show the name (assigned in step 84) of the address that caused the threshold to be exceeded. The subscriber's options at this point are shown in step 108. The subscriber has the option of changing the threshold number, and this option remains available for "X" minutes or until the next message is received at the address that was used most recently. "X" can be, for example, 2 or any number stored in the PMU's memory by the manufacturer, the service operator, or the subscriber. This option is preferably presented to the viewer via the display 59. The subscriber may elect to do nothing, in which case, after "X" minutes, the program proceeds to step 110. At this step, the PMU, if it is a two-way device, sends a message back to the base station 12, instructing it to send all further messages to the subscriber via an alternate route, such as via one or both of the alternate communication links 34, 38.

If the subscriber does elect to change the threshold number when step 108 is executed, the program returns to step 86 where the subscriber can select a new threshold number and/or a new rate alarm, after which the program proceeds as previously described.

It can be seen, therefore, that the flowchart of FIG. 3 indicates two ways in which the PMU can determine whether the threshold number is likely to be excessive, and then to instruct the messaging service to send messages to the subscriber via an alternate route. One method is to take the path from step 94 to step 98 where the PMU can determine whether the rate of message reception is presently excessive and, therefore, likely to develop into a situation where the threshold will be exceeded. The other more direct way used by the program shown in FIG. 3 is to wait until the threshold has been exceeded (step 96) and then to alert the subscriber of that fact and give him the options present at step 108.

As indicated earlier, it is possible to use some of the techniques described herein either at the PMU itself (as shown in the flowchart of FIG. 3), or to do so at the base station end of the system. A way of achieving some of the aspects of this invention at the base station is shown by the flowchart of FIG. 4, to which reference is now made.

Figure 4:
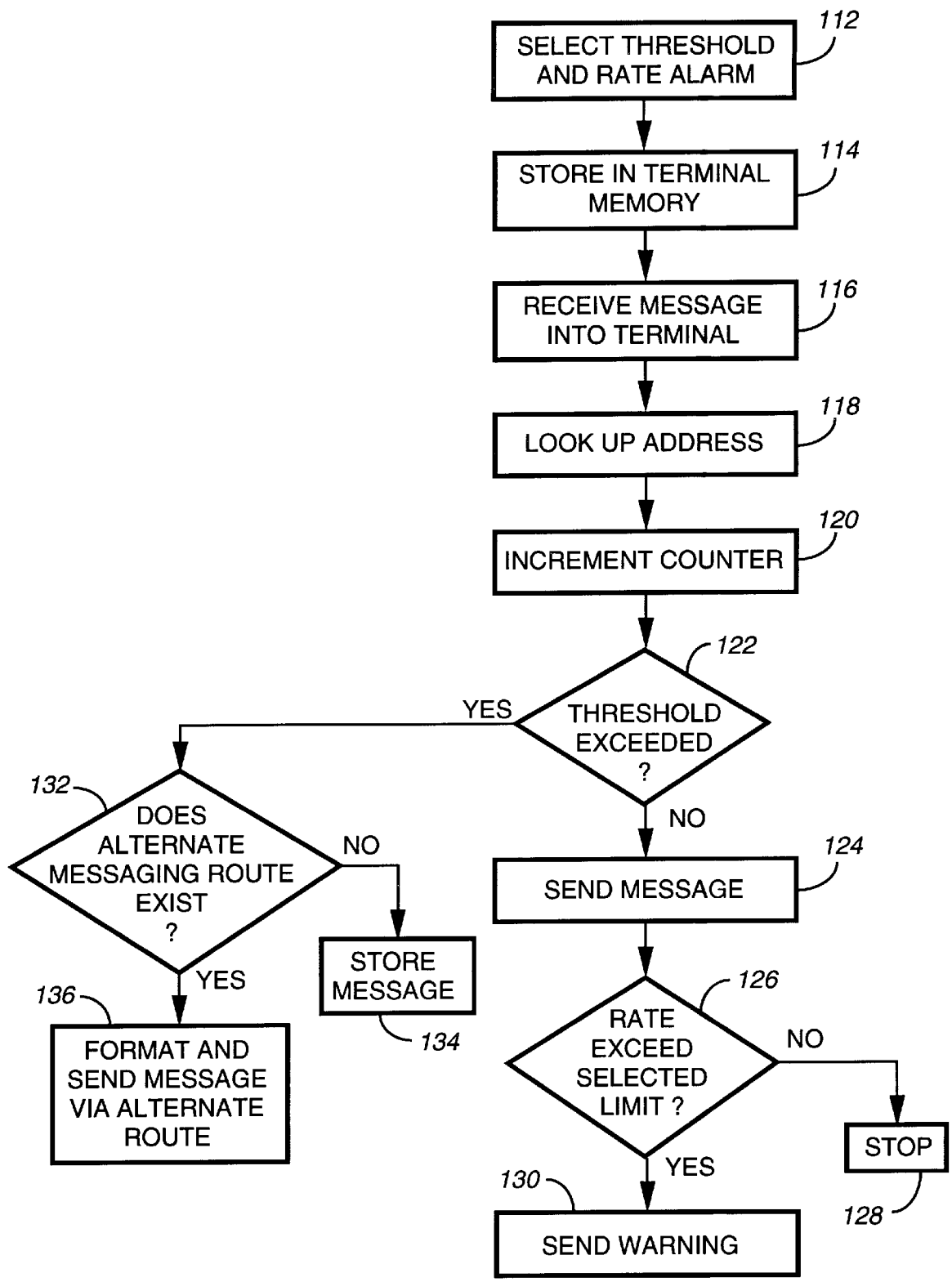
FIG. 4 is a flow chart illustrating how the wireless messaging system is programmed to operate according to the invention.

The program shown in FIG. 4 illustrates how a conventional processor that is located within a paging terminal 22 (FIG. 1) may be programmed to forward messages to the PMU via an alternate route after it has determined that the number of messages to be transmitted to the PMU is likely to be excessive. In the first step 112 a threshold number and rate alarm are selected. These are the same variables that the subscriber selected in step 86 of FIG. 3. In this case, these can be selected by the operator of the messaging service based on his own experience or on inputs from the subscriber. Those variables are then stored in the terminal's memory at step 114. At step 116, the paging terminal receives a message for transmission to the PMU 14. The paging terminal responds by looking up the proper address for the PMU (step 118), and then increments an internal counter (step 120) that is associated with the address referenced in step 118. There is one such counter for each address used by a PMU.

The paging terminal then determines, at step 122, whether the threshold number selected in step 112 has been exceeded by the message which just caused its counter to be incremented. If the threshold is not exceeded, the program proceeds to step 124 for sending the message. In the next step 126, the paging terminal determines whether the rate selected in step 112 has been exceeded. This is the same determination that was made in step 100 of FIG. 3. If the rate has not been exceeded for messages sent to the address in use, the program proceeds to step 128 for exiting the program. However, if the rate has been exceeded, the program proceeds instead to step 130 where the paging terminal causes a message to be sent to the addressed PMU warning its subscriber of the fact that the rate of sending messages to that particular address is likely to cause the threshold number to be exceeded. At that point, the subscriber has the option of contacting his message service to stop all the messages, to have further messages sent to it via an alternate route, to change the thresholds and rates that are presently used, or to do nothing and allow messages to continue to be sent at the present rate. If the threshold number is exceeded when step 122 is executed, the program proceeds from there to step 132 to determine whether the messaging system has an alternate route for transmitting the message to the addressed PMU. If no such alternate route exists (either because the particular subscriber has no other way of receiving messages or because no economically viable alternate exists) the program proceeds to step 134 where the paging terminal causes the message to be stored for later transmission to the subscriber. If an alternate messaging route does exist, the program proceeds from step 132 to step 136 where the messaging terminal formats the message appropriate to the alternate route and sends it to the subscriber, as via the alternate routes 34, 38 shown in FIG. 1.

Although the invention has been described in terms of a preferred embodiment, it will be obvious to those skilled in the art that many variations and alterations may be made without departing from the invention. Accordingly, it is intended that all such alterations and variations be considered as within the spirit and scope of the invention as defined by the appended claims.

What is claimed is:

1. A method for a subscriber's portable messaging unit to control the number, and associated cost, of messages transmitted to it by a wireless messaging service, comprising in the subscriber's portable messaging unit the steps of:

a) storing a threshold number that indicates a number of messages to be received within a given period of time;

b) receiving incoming messages;

c) determining whether the number of incoming messages is likely to exceed the threshold number; and d) if the threshold number is likely to be exceeded, instructing the messaging service to send messages to the subscriber via an alternate route.

2. A method as set forth in claim 1 wherein step c) includes determining the rate at which messages are received.

3. A method as set forth in claim 1 wherein the personal messaging unit has multiple addresses, wherein messages may be sent to each of the multiple addresses, and wherein when the number of incoming messages exceeds the threshold number, the personal messaging unit determines whether one of its addresses was receiving messages at an excessive rate.

4. A method as set forth in claim 3 wherein if one of the personal messaging unit's addresses received messages at an excessive rate, the personal messaging unit alerts the subscriber to the identity of that one address.

5. A method of controlling the number, and associated cost, of messages transmitted by a wireless messaging service to a subscriber's personal messaging unit, comprising:
   a) storing a threshold number that indicates a number of messages to be received within a given period of time;
   b) determining whether the number of messages sent to the personal messaging unit exceeds the threshold number;
   c) if the threshold number is exceeded, giving the subscriber the option of changing the threshold number; and
   d) if the subscriber does not exercise the option, instructing the messaging service to send messages to the subscriber via an alternate route.

6. A method as set forth in claim 5 wherein the personal messaging unit has multiple addresses, wherein messages may be sent to each of the multiple addresses, and including determining whether messages were sent to any one address of the personal messaging unit at an excessive rate.

7. A method for controlling the number, and associated cost, of messages transmitted by a wireless messaging service to a subscriber's personal messaging unit that can receive messages sent to any one of multiple addresses, comprising:
   a) storing a threshold number that indicates a number of messages to be received within a given period of time;
   b) determining whether the number of messages sent to the personal messaging unit exceeds the threshold number; and
   c) if the threshold number is not exceeded, and messages were sent to any one address of the personal messaging unit at an excessive rate, instructing the messaging service to send messages for that one address via an alternate route.

8. A method as set forth in claim 7 wherein if messages were sent to one of the personal messaging unit's addresses at an excessive rate, the personal messaging unit alerts the subscriber to the identity of that one address.

9. A method as set forth in claim 7 wherein the threshold number is selected by the subscriber.

10. A method as set forth in claim 7 wherein a rate deemed to be excessive is determined by the subscriber.

11. A method for a subscriber's personal messaging unit to control the number, and associated cost, of messages transmitted to it by a wireless messaging service, comprising in the subscriber's portable messaging unit the steps of:
    a) storing a threshold number that indicates a number of messages to be received within a given period of time;
    b) receiving and counting incoming messages;
    c) determining whether the number of incoming messages exceeds the threshold number; and
    d) if the threshold number is exceeded, instructing the messaging service to send messages to the subscriber via an alternate route; and
    e) if the threshold number is not exceeded, determining whether messages were sent to any one address of the personal messaging unit at an excessive rate.

12. A method for a wireless messaging service to control the number, and associated cost, of messages transmitted to a subscriber's personal messaging unit that has multiple addresses, comprising in a base station of the wireless messaging service the steps of:
    a) storing a threshold number that indicates a number of messages to be transmitted to the personal messaging unit within a given period of time;
    b) counting messages transmitted to the personal messaging unit;
    c) determining whether the number of messages transmitted to the personal messaging unit exceeds the threshold number;
    d) if the threshold number is not exceeded, transmitting a message to the personal messaging unit; and
    e) if the threshold number is exceeded, forwarding the message to the personal messaging unit via an alternate route.

13. A method as set forth in claim 12 including determining whether messages were sent to one of the personal messaging unit's multiple addresses at an excessive rate.

14. A method as set forth in claim 13 wherein if an excessive rate is determined, a warning is transmitted to the subscriber.

* * * * *